US009740235B1

(12) United States Patent
Xiu

(10) Patent No.: US 9,740,235 B1
(45) Date of Patent: Aug. 22, 2017

(54) CIRCUITS AND METHODS OF TAF-DPS BASED INTERFACE ADAPTER FOR HETEROGENEOUSLY CLOCKED NETWORK-ON-CHIP SYSTEM

(71) Applicant: Liming Xiu, Plano, TX (US)

(72) Inventor: Liming Xiu, Plano, TX (US)

(73) Assignee: Liming Xiu, Plano, TX (US)

( * ) Notice: Subject to any disclaimer, the term of this patent is extended or adjusted under 35 U.S.C. 154(b) by 132 days.

(21) Appl. No.: 14/639,332

(22) Filed: Mar. 5, 2015

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
CPC ..................................... G06F 1/08; G06F 1/12
See application file for complete search history.

(56) References Cited

U.S. PATENT DOCUMENTS

| 2007/0055718 | A1* | 3/2007 | Xu | G06F 1/025 708/270 |
| 2008/0215786 | A1* | 9/2008 | Goossens | H04L 12/417 710/243 |
| 2009/0049212 | A1* | 2/2009 | Mangano | H04L 7/005 710/61 |
| 2011/0285439 | A1* | 11/2011 | Xiu | G06F 1/025 327/159 |
| 2014/0093015 | A1* | 4/2014 | Xiu | H03L 7/0807 375/340 |
| 2014/0197867 | A1* | 7/2014 | Xiu | G06F 1/08 327/105 |
| 2014/0376569 | A1* | 12/2014 | Philip | G06F 1/04 370/503 |
| 2016/0173074 | A1* | 6/2016 | Chen | H03K 5/135 365/233.11 |

* cited by examiner

*Primary Examiner* — Jaweed A Abbaszadeh
*Assistant Examiner* — Cheri Harrington
(74) *Attorney, Agent, or Firm* — Liming Xiu

(57) ABSTRACT

An interface adapter for facilitating the data communication among computation modules in a Network-on-Chip SoC comprises 1) a FIFO block having certain number of storage cells for temporarily storing the data to be transported between two communicating modules; 2) a TAF-DPS clock generator and a multi-phase generator attached at the FIFO write side for generating the write clock for FIFO and the driving clock for the transmitter, a TAF-DPS clock generator and a multi-phase generator attached at the FIFO read side for generating the read clock for FIFO and the driving clock for the receiver; 3) a write pointer controller and a read pointer controller for reading the FIFO status and controlling the TAF-DPS clock generators at the write side and at the read side, respectively. A design scheme of using said interface adapters in Network-on-Chip SoC design includes a plurality of computation modules, routing modules, said interface adapters, a network of communication link, a network of global clock distribution. Methods of creating the interface adapter and using it in the Network-on-Chip SoC design are also disclosed.

11 Claims, 9 Drawing Sheets

US 9,740,235 B1

CIRCUITS AND METHODS OF TAF-DPS BASED INTERFACE ADAPTER FOR HETEROGENEOUSLY CLOCKED NETWORK-ON-CHIP SYSTEM

FIELD OF THE INVENTION

The present invention generally relates to the field of integrated circuit. More specifically, embodiments of the present invention pertain to circuits and methods of digital data communication between entities driven by clocks having different frequencies and/or phases.

DISCUSSION OF THE BACKGROUND

In many modern applications, an electronic system is comprised of multiple subsystems. These subsystems could be blocks, modules or discrete chips. For successful operation, one of the key tasks is the data communication among the subsystems. Data communication refers to the work of transferring information from one subsystem to one (or more) other subsystem(s). The information sender is often termed transmitter and the information taker is called receiver. The information transfer can be carried out in either digital or analog fashion. In most modern systems, digital data communication is the preferred method due to its low cost, high data rate and high reliability.

With billions of transistors used in today's large chips, the advantage of uniprocessor architectures is diminishing due to its demand for high power, high clock frequency and the global distribution of clock signal. Multicore chips are emerging as the prevailing architecture in both general-purpose and application-specific markets since this architecture allows the distribution of the computation load to multiple cores which can operate at their optimum speeds (clock frequencies). Consequently, the challenge in architecture design is shifted from computation to communication. As the core count increases, the need for a scalable on-chip communication architecture that can deliver high bandwidth becomes a necessity. Traditionally, bus has been the dominant structure for System-on-Chip (SoC) on-chip communication. However, it does not scale well with the increased number of cores. This leads to the recent architecture of Networked-on-Chip (NoC) communication. In this approach, from any source to any destination, data is routed by logical or physical links using a predefined protocol. NoC is a SoC design strategy that separates the tasks of computation and communication in a controlled way so that each of them can be addressed efficiently.

In this trend of designing large SoC using the NoC communication methodology, a challenging problem is to robustly interface the design domains driven by clocks having different frequencies and phases. FIG. 1 is an example illustrating the problem. In this exemplary system, there are four subsystems 101, 102, 103 and 104. For each of such subsystems, the circuit is designed using the synchronous design principle (i.e. all the circuitries are operating under the control of a clock signal). Each subsystem is called a synchronous domain. Overall, however, the clock signals for the subsystems are independent of each other. Each of the clock signals has its unique clock frequency and phase. For this reason, this system is termed heterogeneously clocked system.

When any of the subsystem needs to communicate with any other subsystem, there is a need of interface adapter 105 for being inserted in between. This interface adapter is required to handle the frequency (data rate) difference existed between the communicating domains. The goal is to 1) prevent data lost and 2) prevent invalid data from being created (i.e. a data being used more than one time). For this reason, a first-in-first-out memory (FIFO) is usually used in the interface for temporarily storing the data.

Two electronic blocks are connected to the input and output of a FIFO: one that writes and one that reads. If certain timing conditions must be maintained between the writing and the reading blocks, the FIFO is termed exclusive read/write FIFO. In exclusive read/write FIFOs, the writing of data is not independent of how the data are read. There are timing relationships between the write clock and the read clock. To use such exclusive FIFO between two blocks that work asynchronously to one another, an additional circuit is required for synchronization. This synchronization circuit usually reduces the data rate considerably. Exclusive read/write FIFO is hardly used in modern applications.

If there are no timing restrictions on how the blocks are driven (i.e. the writing block and the reading block can work out of synchronism), the FIFO is called concurrent read/write FIFO. In concurrent read/write FIFOs, there is no dependence between the writing and reading of the data. Simultaneous writing and reading are possible in overlapping fashion or successively. In other words, two blocks driven by clocks of different frequencies and phases can be connected to the FIFO. Concurrent read/write FIFOs, depending on the control signals for writing and reading, fall into two groups: synchronous FIFO and asynchronous FIFO.

FIG. 2A shows the structure of asynchronous FIFO. In the left drawing of FIG. 2A, asynchronous FIFO 200 has three signals Full_Status, Input_Data, Write_Clock that interface the writing block (the transmitter, or TX) and three signals Empty_Status, Output_Data, Read_Clock that interface the reading block (the receiver, or RX). In the right drawing of FIG. 2A, an implementation is illustrated. FIFO storage 201 has two input pins DIN, PUT and one output pin OK_to_PUT for handling the write operation. DIN is the data input port used to receive the data TX_DATA coming from the TX. PUT is used to receive the write request from the TX. OK_to_PUT is used for outputting the signal that grants or denies the write request. The TX_DATA is controlled by transmitter clock CLKT that is generated from clock generator TX 205. The READY_to_PUT signal is controlled by CLKT and logic cells 202 and 203. The OK_to_PUT is used to stop the clock CLKT though logic cell 204 when certain condition is reached (such as the FIFO is full). For read operation, similar handshake mechanism is employed through pins DOUT, TAKE, OK_to_TAKE, signals RX_DATA, READY_to_TAKE, CLKR, logic cells 206, 207, 208 and clock generator RX 209. Similarly, the receiver clock CLKR can be stopped by OK_to_TAKE if certain condition is reached (such as the FIFO is empty).

FIG. 2B shows the structure of synchronous FIFO. In the left drawing of FIG. 2B, synchronous FIFO 250 has four signals Full_Status, Input_Data, Write_Clock, Write_Enable that interface the writing block (the transmitter, or TX) and four signals Empty_Status, Output_Data, Read_Clock, Read_Enable that interface the reading block (the receiver, or RX). In the right drawing of FIG. 2B, an implementation is illustrated. FIFO storage 251 has two input pins DIN, PUT and one output pin OK_to_PUT for handling the write operation. DIN is the data input port used to receive the data TX_DATA coming from the TX. PUT is used to receive the write request from the TX. OK_to_PUT is used for outputting the signal that grants or denies the write request. The signals OK_to_PUT, PUT and the circuit blocks 252, 253 work together to function as the signals Full_Status and Write_Enable associated with block 250. For read operation, similar operation is carried out through pins DOUT, TAKE, OK_to_TAKE, signals RX_DATA, TAKE, READY_to_TAKE, CLKR, logic cells 254, 255.

The key difference between the asynchronous FIFO of FIG. 2A and the synchronous FIFO of FIG. 2B is that the clock signals are modified by the FIFO status in the case of asynchronous FIFO while the clock signals are free running at fixed rates in the case of synchronous FIFO. Asynchronous FIFO has the advantage of using potentially smaller size of storage since the clock signals can be stopped. It can achieve smaller data latency. But the output from the clock generator (usually an oscillator, such as an inverter ring) is difficult to be made high quality (low jitter, low noise) since the oscillator is turned on and off frequently. In the synchronous FIFO case, the clocks are free-run. Thus, system designer does not need to worry about the generation or the manipulation of those clock signals. Standard digital design EDA tools are sufficient for designer to handle the design task. However, depending on the size of the frequency difference between the TX and RX, it has the drawback of using potentially larger storage.

Refer now back to FIG. 1, to improve the information processing efficiency of the heterogeneously clocked system 100, the key task is to develop an interface adapter 105 that can efficiently handle both the storage management and the clock management under the condition that the driving clocks of the communicating blocks can have different frequencies and/or phases.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

It is therefore an object of the present invention to develop an interface adapter that can efficiently enhance the information processing efficiency of heterogeneously clocked system through the means of storage management, global clock distribution and local clock generation. It is a further object of the present invention to use this interface adapter in the design of Network-on-Chip SoCs.

The present invention relates to circuits and systems that use a global clock network to distribute a global clock signal to local interface adapters, use Time-Average-Frequency direct period synthesizer (TAF-DPS) to create local clock signals for driving synchronous subsystems and for managing FIFO storage. Thus, the present invention can result in the reduction in system power consumption, system physical size, and system manufacture cost. The present invention further improves the system information processing efficiency by reducing the data latency in the process of data communication. These and other advantages of the present invention will become readily apparent from the detailed description of various embodiments below.

DETAILED DESCRIPTION

Figure 1:
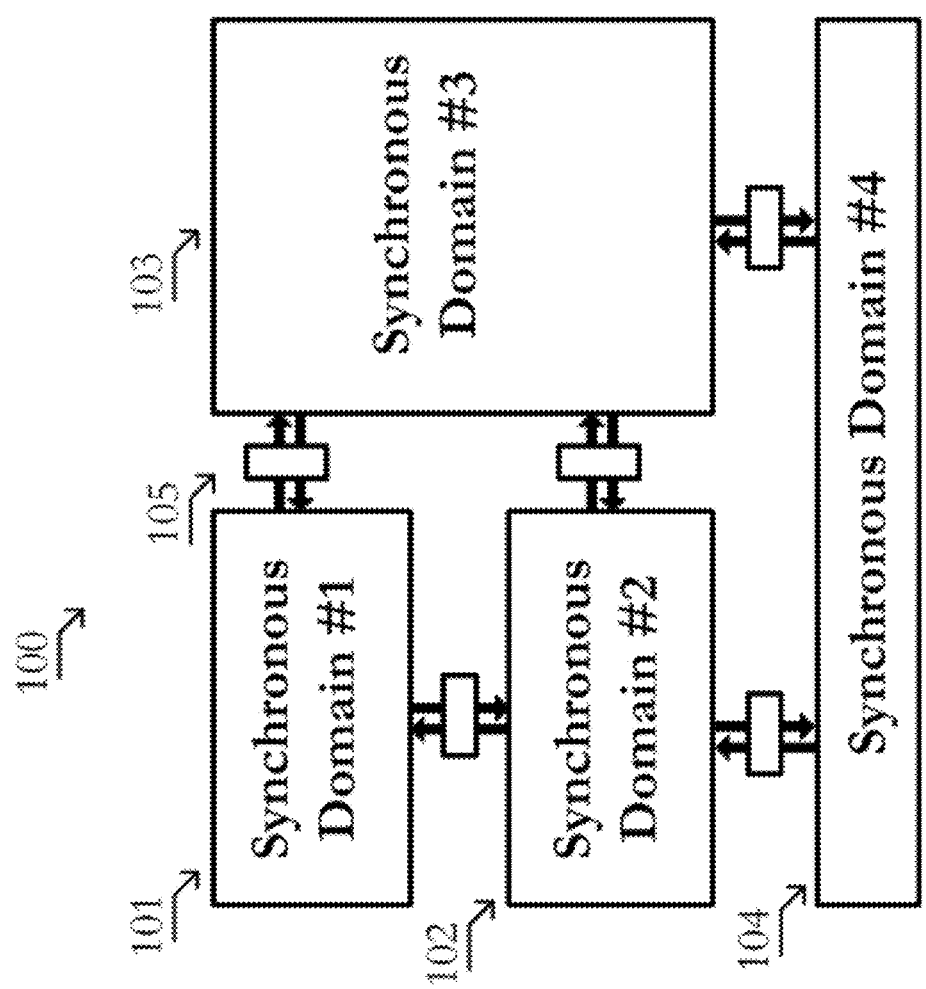
FIG. 1 is an electrical diagram, in block form, showing an electronic system comprised of multiple synchronous subsystems having data communication among them.
Figure 2A:
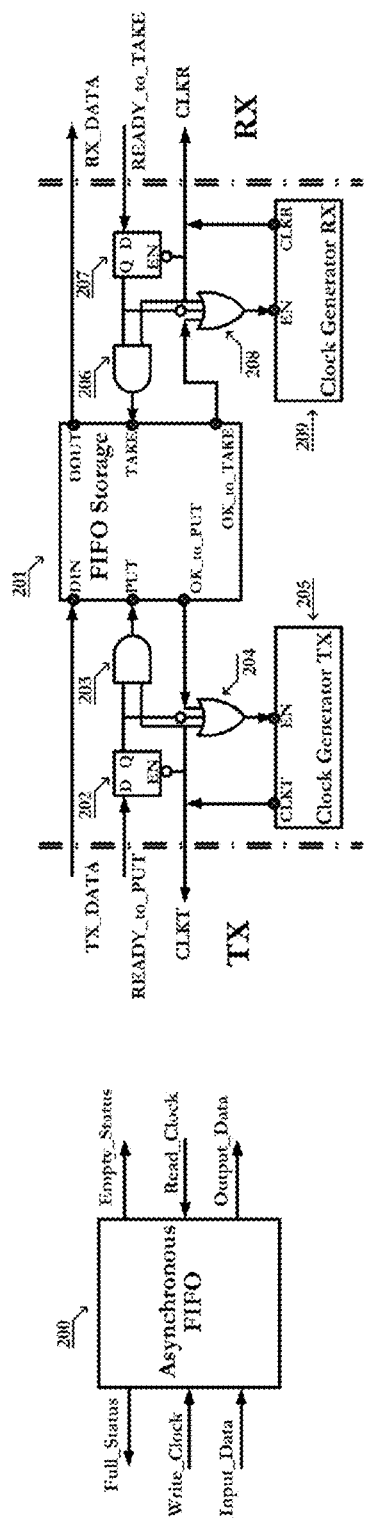
FIG. 2A is an electrical diagram, in block form, showing an asynchronous FIFO for facilitating the data communication between two blocks of different operating frequencies.
Figure 2B:
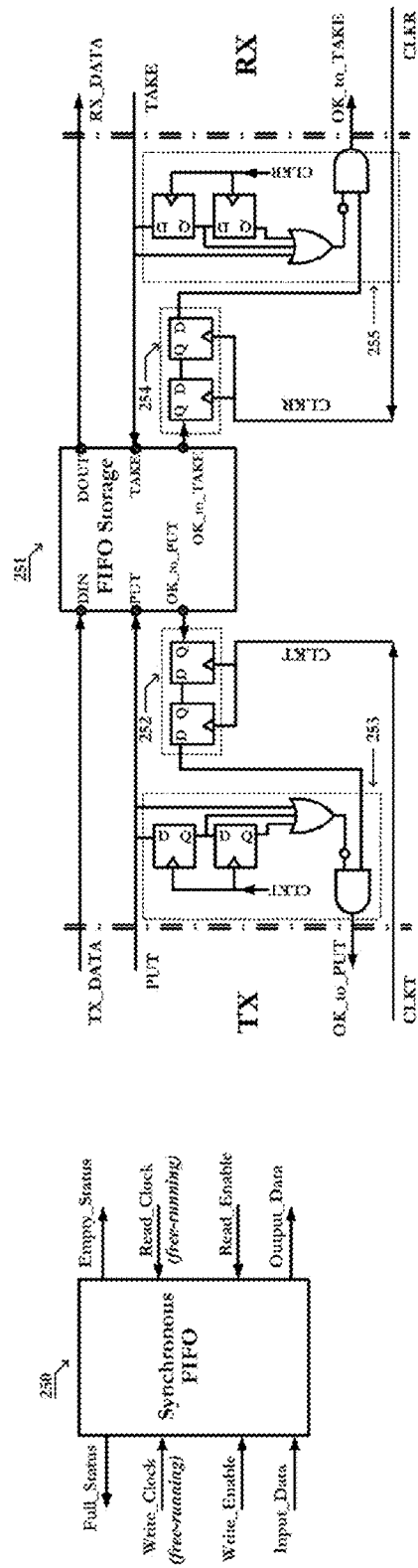
FIG. 2B is an electrical diagram, in block form, showing a synchronous FIFO for facilitating the data communication between two blocks of different operating frequencies.

Reference will now be made in detail to various embodiments of the invention, examples of which are illustrated in the accompanying drawings. While the invention will be described in conjunction with the following embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the arts of VLSI-circuit-and-system design to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system.

It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or signal processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, flip-flops, other such information storage, transmission or display devices, etc.) into other data similarly represented as physical quantities within other components of the same or a different system or architecture.

Furthermore, for the sake of convenience and simplicity, the terms "clock," "time," "rate," "period," "frequency" and grammatical variations thereof are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (each of which may refer to direct or indirect connections, couplings, and communications), as may the terms "electrical path," "channel," "wire" (each of which may refer to a physical channel for transferring electrical signal), as may the terms "signal," "pulse," "pulse train," "a sequence of digital data" (each of which may refer to an electrical signal that has only two values: zero and one), as may the terms "input," "input port," "input pin" (each of which may refer to a physical channel for receiving data), as may the terms "output," "output port," "output pin" (each of which may refer to a physical channel for sending data), as may the terms "transmitter," "TX," "data processing unit sending data" (each of which may refer to a data processing unit that sends data to other units), as may the terms "receiver," "RX," "data processing unit receiving data" (each of which may refer to a data processing unit that receives data from other units), but these terms are also generally given their art-recognized meanings.

Exemplary Interface Adapter Circuit

Figure 3:
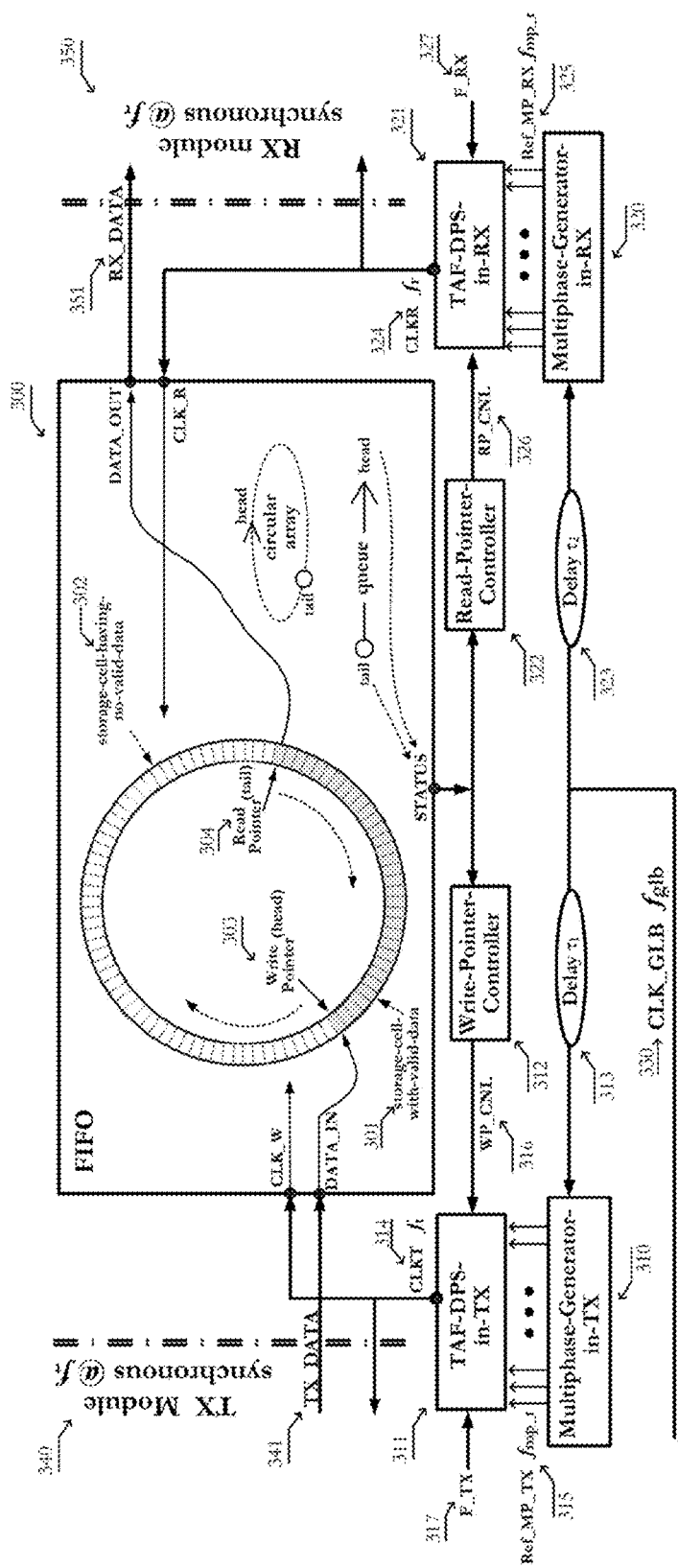
FIG. 3 is an electrical diagram, in block form, illustrating an embodiment implementing the interface adapter according to the present invention.

Referring now to FIG. 3, an embodiment implementing the interface adapter according to the present invention will be explained. A FIFO block 300 is used for temporarily storing the data to be transmitted from TX to RX. The storage elements inside the FIFO can be made of dual-port SRAM cells, or flip-flops or other types of storage cells. Those storage cells in the FIFO are configured in a circular buffer fashion. The circular buffer has a write pointer 303 for specifying the address of the cell that is used for next data (i.e. to-be-written data) to be written to. This to-be-written data comes from FIFO input data port DATA_IN. After each write operation, the write pointer will point to next storage cell. The write pointer moves in a clockwise (or count-clockwise) direction. The circular buffer has a read pointer 304 for specifying the address of the cell whose data will be read out (i.e. to-be-read data). This to-be-read data will be sent to FIFO output data port DATA_OUT. After each read operation, the read pointer will point to next storage cell. The read pointer moves in the same direction as that of write pointer, clockwise or count-clockwise.

Initially, after a system-power-up or after a reset, the write pointer and the read pointer point to the same address. When a storage cell has data stored through using the write pointer, the cell is called storage-cell-with-valid-data. An example of such cell is cell 301. If a storage cell has not been pointed by the write pointer or its data has been read out by the read pointer, the cell is called storage-cell-having-no-valid-data. An example of such cell is cell 302. In this circular buffer, the section comprised of storage-cell-with-valid-data cells is termed queue. The write pointer is the head of the queue. The read point is the tail of the queue. The write and read operations are controlled by clock signals inputted through ports CLK_W and CLK_R, respectively. The FIFO block 300 has an additional output port STATUS. The head and tail information regarding the FIFO operation is outputted through port STATUS to block Write-Pointer-Controller 312 and Read-Pointer-Controller 322. The signal outputted from the port STATUS could include such information as FIFO full, FIFO empty, FIFO half full, FIFO half empty, etc.

On one side of the FIFO block, there is a transmitter TX module 340. It is a synchronous block with driving clock CLKT 314 of frequency $f_t$. Signal TX_DATA 341 is generated from TX module 340 and is the data to be transmitted to the receiver thorough FIFO block 300. On another side of FIFO block, there is a receiver RX module 350. It is a synchronous block with driving clock CLKR 324 of frequency $f_r$. Signal RX_DATA 351 is outputted from the FIFO block 300. It is the data originally transmitted from the TX module 340.

The interface adapter receives a globally distributed clock signal CLK_GLB 330 whose frequency is $f_{glb}$. This signal CLK_GLB 330 is the reference for generating the TX side clock signal CLKT 314 and the RX side clock signal CLKR 324. Signal CLK_GLB 330 is delivered to block of Multiphase-Generator-in-TX 310 though wire 313 with delay $\tau_1$. Block 310 generates a multi-phase signal Ref_MP_TX 315 at frequency $f_{mp\_t}$ and sends it to block TAF-DPS-in-TX 311. Block 311 also receives signal WP_CNL 316 from Writer-Pointer-Controller 312 and signal F_TX 317 from user. F_TX is the frequency control word used to synthesize the frequency $f_t$ for signal CLKT 314. Using the signals Ref_MP_TX, F_TX and WP_CNL, block TAF-DPS-in-TX 311 generates the clock signal CLKT 314 for TX module 340. Similarly, signal CLK_GLB 330 is delivered to block of Multiphase-Generator-in-RX 320 though wire 323 with delay $\tau_2$. Block 320 generates a multi-phase signal Ref_MP_RX 325 at frequency $f_{mp\_r}$ and sends it to block TAF-DPS-in-RX 321. Block 321 also receives signal RP_CNL 326 from Read-Pointer-Controller 322 and signal F_RX 327 from user. F_RX is the frequency control word used to synthesize the frequency $f_r$ for signal CLKR 324. Using the signals Ref_MP_RX, F_RX and RP_CNL, block TAF-DPS-in-RX 321 generates the clock signal CLKR 324 for RX module 350.

This interface adapter is constructed in such a way that, physically for a particular side of the FIFO, it can interface the TX module at one time and interface the RX module at other time. In other words, the circuitries of TAF-DPS, Multiphase-Generator, Pointer-Controller are labeled with "-TX" when they interface TX and are labeled "-RX" when they interface RX. Structurally, the corresponding "-TX"

and "-RX" circuitries are identical. In addition, the FIFO's DATA_IN and DATA_OUT ports can be realized through circuit of an inout port (i.e. bidirectional port) whose data flow direction is controlled by a control signal.

Figure 4A:
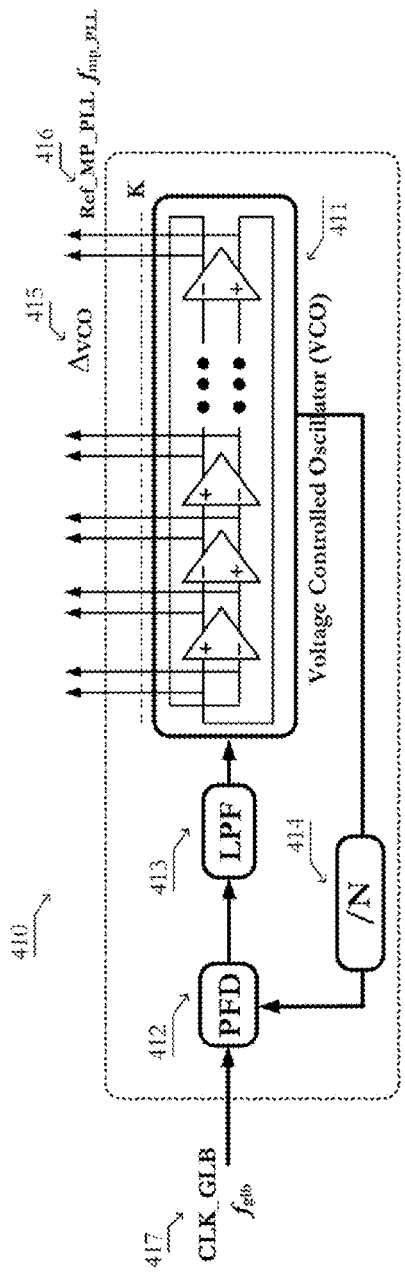
FIG. 4A is an electrical diagram, in block form, showing the principle of using PLL to generate a multi-phase signal for TAF-DPS.

Referring now to FIG. 4A, in one embodiment of present invention, an exemplary PLL 410 used for generating a multi-phase signal Ref_MP_PLL 416 comprises a phase frequency detector (PFD) 412, a low pass filter (LPF) 413, a Voltage Controlled Oscillator (VCO) 411 and a frequency divider 414 of dividing ratio N. The PLL 410 uses signal CLK_GLB 417 as its reference. The VCO 411 is comprised of a ring of delay stages. The delay stage can be single-end cell or differential cell. The outputs from those delay stages of K stages single-end cells or K/2 stages differential cells form the VCO 411 multi-phase output signal Ref_MP_PLL of frequency $f_{mp\_PLL}$ with K phases. K is an integer and it is an even number in the case of differential delay stage. All the delay stages in the VCO are structurally identical. Consequently, all the time delays between any two logically adjacent phases are equal. The time delay is termed $\Delta_{VCO}$ 415. The $\Delta_{VCO}$ can be calculated as $\Delta_{VCO}=T_{mp\_PLL}/K=1/(K \cdot f_{mp\_PLL})$. PLL 410 can function as the Multiphase-Generator-in-TX 310 of FIG. 3 while signal Ref_MP_PLL 416 is the signal Ref_MP_TX 315 in FIG. 3 and signal CLK_GLB 417 is the signal CLK_GLB 330 in FIG. 3. Similarly, PLL 410 can function as the Multiphase-Generator-in-RX 320 of FIG. 3 while signal Ref_MP_PLL 416 is the signal Ref_MP_RX 325 in FIG. 3 and signal CLK_GLB 417 is the signal CLK_GLB 330 in FIG. 3. Using the PLL relationship $f_{mp\_PLL}=N \cdot f_{glb}$, the value of $\Delta_{VCO}$ 415 can be expressed in (1).

$$\Delta_{VCO}=1/(K \cdot f_{mp\_PLL})=1/(K \cdot N \cdot f_{glb}) \quad (1)$$

Figure 4B:
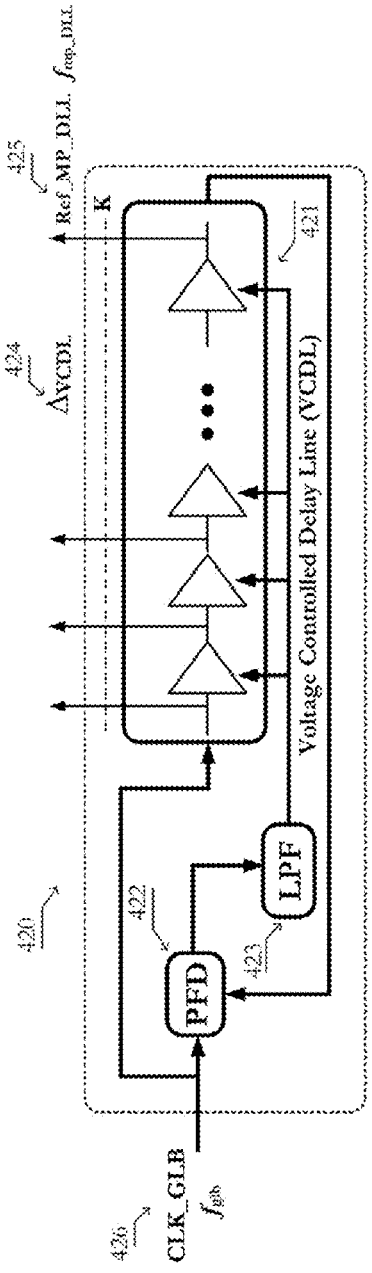
FIG. 4B is an electrical diagram, in block form, showing the principle of using DLL to generate a multi-phase signal for TAF-DPS.

Referring now to FIG. 4B, in another embodiment of present invention, an exemplary DLL 420 used for generating a multi-phase signal Ref_MP_DLL 425 comprises a phase frequency detector (PFD) 422, a low pass filter (LPF) 423, and a Voltage Controlled Delay Line (VCDL) 421. The DLL 420 uses signal CLK_GLB 426 as its reference. The VCDL 421 is comprised of a series of delay stages. The delay stage can be single-end cell or differential cell. The outputs from those delay stages of K stages single-end cells or K/2 stages differential cells form the VCDL 421 multi-phase output signal Ref_MP_DLL 425 of frequency $f_{mp\_DLL}$ with K phases. K is an integer and it is an even number in the case of differential delay stage. All the delay stages in the VCDL are structurally identical. Consequently, all the time delays between any two logically adjacent phases are equal. The time delay is termed $\Delta_{VDCL}$ 424. The $\Delta_{VDCL}$ can be calculated as $\Delta_{VCDL}=T_{mp\_DLL}/K=1/(K \cdot f_{mp\_DLL})$. DLL 420 can function as the Multiphase-Generator-in-TX 310 of FIG. 3 while signal Ref_MP_DLL 425 is the signal Ref_MP_TX 315 in FIG. 3 and signal CLK_GLB 426 is the signal CLK_GLB 330 in FIG. 3. Similarly, DLL 420 can function as the Multiphase-Generator-in-RX 320 of FIG. 3 while signal Ref_MP_DLL 425 is the signal Ref_MP_RX 325 in FIG. 3 and signal CLK_GLB 426 is the signal CLK_GLB 330 in FIG. 3. Using the DLL relationship $f_{mp\_DLL}=f_{glb}$, the value of $\Delta_{VDCL}$ 424 can be expressed in (2).

$$\Delta_{VCDL}=1/(K \cdot f_{mp\_DLL})=1/(K \cdot f_{glb}) \quad (2)$$

Figure 5:
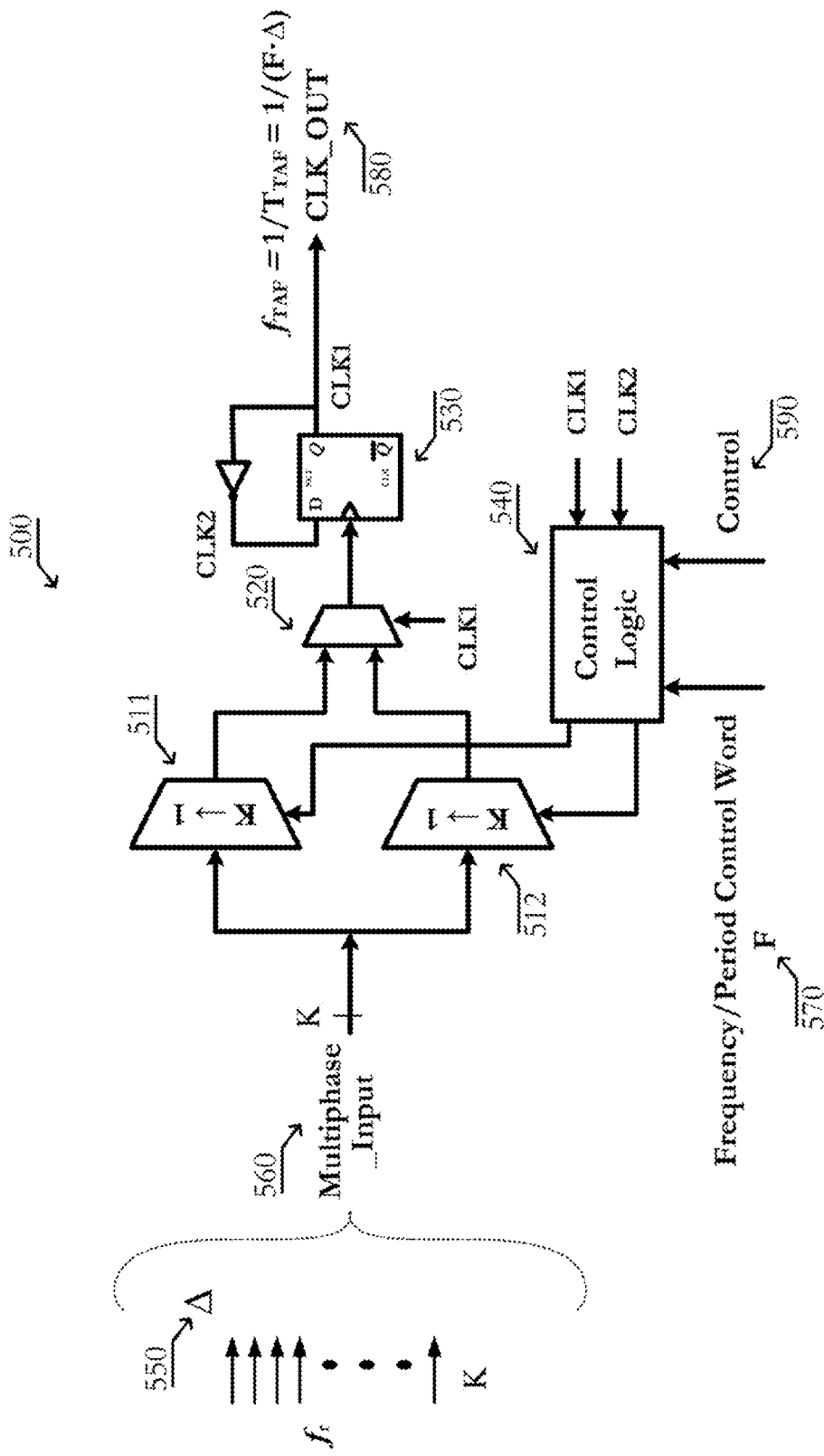
FIG. 5 is an electrical diagram, in block form, showing the circuit structure of TAF-DPS.

Referring now to FIG. 5, in one embodiment of present invention, an exemplary TAF-DPS clock generator 500 comprises two K→1 multiplexers 511 and 512, a 2→1 multiplexer 520, a D-type flip-flop configured as toggle flip-flop 530 and a control logic block 540. The TAF-DPS clock generator 500 takes signal Multiphase_Input 560 as an input. Multiphase_Input 560 has K evenly-spaced phases with frequency $f_r$. The time delay between any two logically adjacent phases is $\Delta$ 550 and it is calculated as $\Delta=T_r/K=1/(K \cdot f_r)$. The TAF-DPS clock generator 500 takes another signal F 570 as input to control its output frequency (or period). The TAF-DPS clock generator 500 has an output signal CLK_OUT 580 with frequency $f_{TAF}$. The control signal 590 received by control block 540 is used to stop or stretch the CLK_OUT 580. The control signal 590 can also be used to represent the FIFO fullness status so that the TAF-DPS output signal CLK_OUT 580 can be made to follow the FIFO status. The control signal 590 can be either WP_CNL 316 or RP_CNL 326 of FIG. 3.

The working principle of TAF-DPS 500 can be found in chapter 4 of reference [1]. The signal Multiphase_Input 560 can be either signal Ref_MP_PLL 416 of FIG. 4A, or signal Ref_MP_DLL 425 of FIG. 4B, or a multi-phase signal created by other means (such as generated by using a divider-chain). TAF-DPS clock generator 500 can function as the block TAF-DPS-in-TX 311 and the block TAF-DPS-in-RX 321 in FIG. 3. The signal F 570 functions as the signal F_TX 317 and the signal F_RX 327 in FIG. 3. The signal CLK_OUT 580 functions as the signal CLKT 314 and/or CLKR 324 in FIG. 3.

The signal CLK_OUT 580 output frequency $f_{TAF}$ can be calculated using (3) (please see chapter 4 of reference [1]). When PLL 410 of FIG. 4A is used as the TAF-DPS clock generators in FIG. 3, $\Delta=\Delta_{VCO}$ and the frequencies for signals CLKT and CLKR can be expressed in (4) and (5), respectively.

$$f_{TAF}=1/T_{TAF}=1/(F \cdot \Delta)=(K/F) \cdot f_r \quad (3)$$

$$f_t=1/(F\_TX \cdot \Delta_{VCO})=(K \cdot N/F\_TX) \cdot f_{glb} \quad (4)$$

$$f_r=1/(F\_RX \cdot \Delta_{VCO})=(K \cdot N/F\_RX) \cdot f_{glb} \quad (5)$$

When DLL 420 of FIG. 4B is used as the TAF-DPS clock generators in FIG. 3, $\Delta=\Delta_{VCDL}$ and the frequencies for signals CLKT and CLKR can be expressed in (6) and (7), respectively.

$$f_t=1/(F\_TX \cdot \Delta_{VCDL})=(K/F\_TX) \cdot f_{glb} \quad (6)$$

$$f_r=1/(F\_RX \cdot \Delta_{VCDL})=(K/F\_RX) \cdot f_{glb} \quad (7)$$

Figure 6A:
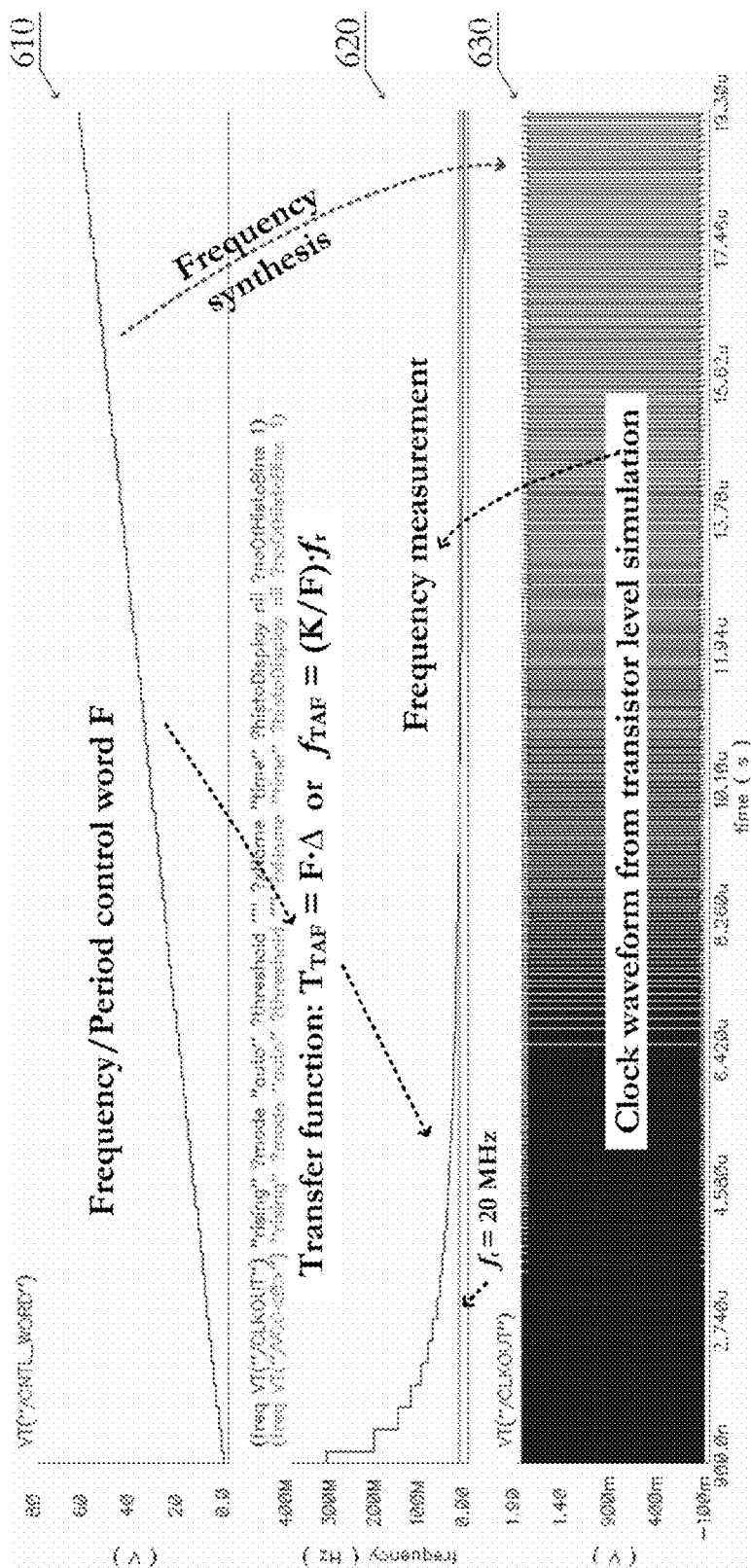
FIG. 6A is a diagram showing the simulation result of a TAF-DPS clock generator when its frequency control word is changed gradually one step at a time.
Figure 6B:
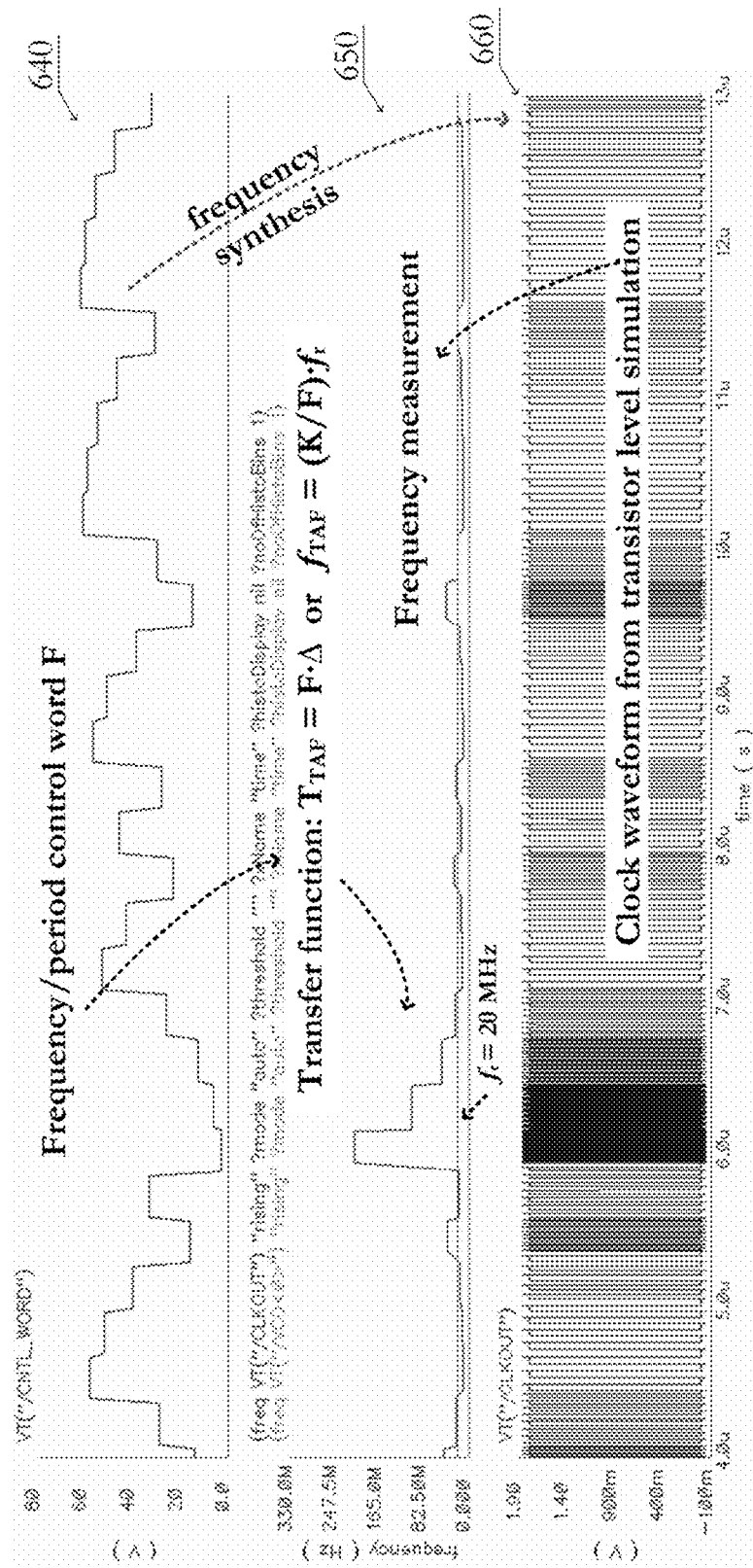
FIG. 6B is a diagram showing the simulation result of a TAF-DPS clock generator when its frequency control word is changed randomly.

Referring now to FIG. 6A, the frequency generation capability of TAF-DPS clock generator 500 in FIG. 5 is demonstrated through transistor level simulation. In the circuit configuration for this simulation, K=32 and $f_r$=20 MHz. Curve 610 shows that the frequency control word F changes from 2 to 2K (=64), increased by 1 at each update. Curve 620 shows the corresponding frequency output. Waveform 630 is the TAF-DPS output waveform corresponding to each F value. Curve 620 is obtained by calculating the frequency from waveform 630. The simulation result aligns with what is predicated from (3). FIG. 6B shows a similar simulation but with frequency control word F changing randomly. Curve 640 shows the frequency control word F change. Waveform 660 is the TAF-DPS output waveform. Curve 650 is its frequency measurement.

From the results of FIGS. 6A and 6B, it is understood that CLKT 314 and CLKR 324 of FIG. 3 can have many choices when selecting their operating frequencies. From equations (4)-(7), the desired frequencies can be generated by using appropriate F_TX and F_RX values. The frequencies and phases of CLKT and CLKR can be controlled independently from each other. Also, the frequencies of CLKT and CLKR can be changed frequently in meeting the requirements of the corresponding computation blocks.

Figure 7:
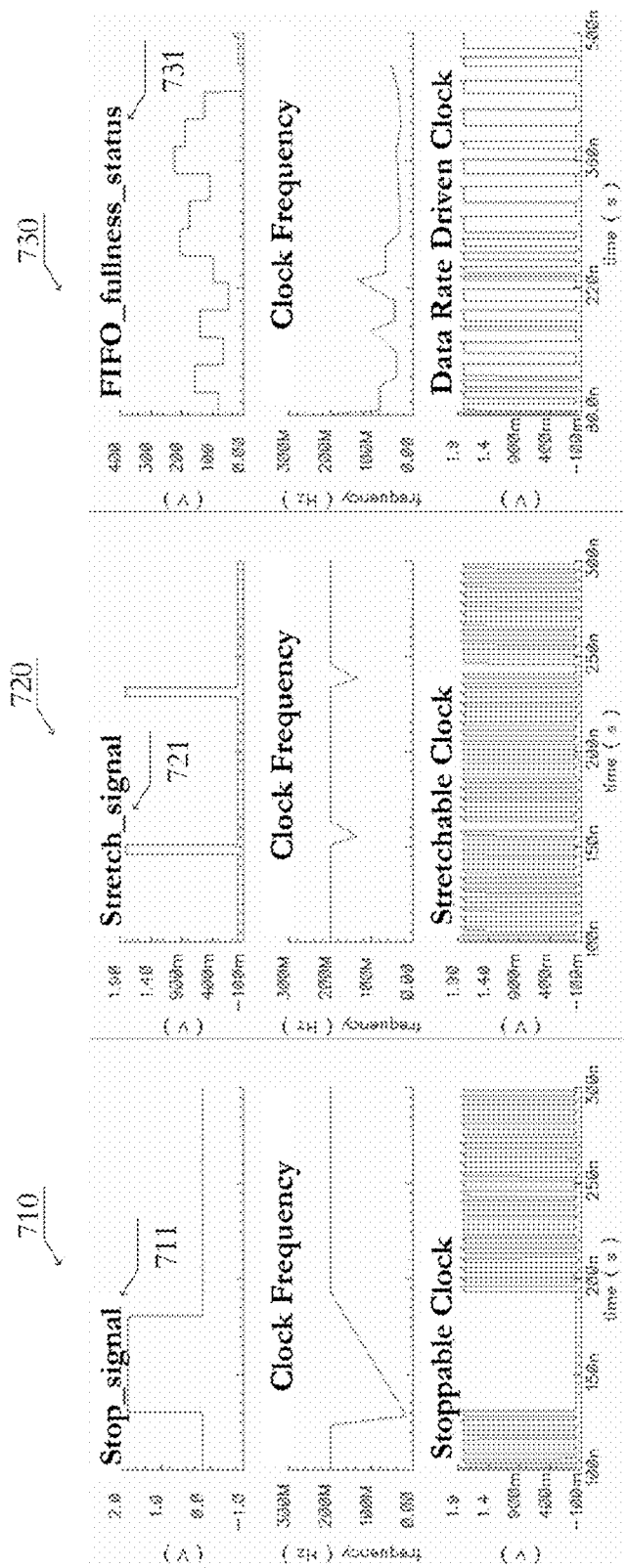
FIG. 7 is a diagram showing the simulation results of a TAF-DPS clock generator under various control signals.

Referring now to FIG. 7, another important capability of TAF-DPS clock generator 500 in FIG. 5 is demonstrated through simulation. Simulation result 710 shows that the TAF-DPS output clock signal can be stopped when instructed. Simulation result 720 shows that the TAF-DPS output clock signal can be stretched when instructed. Simulation result 730 shows that the TAF-DPS output clock signal can be made to follow a given pattern. Such pattern could be the FIFO_fullness_status. Based on the status of Write Pointer 303 and Read Pointer 304 in FIG. 3, the Stop_signal 711, Stretch_signal 721 and FIFO_fullness_status 731 can be generated from Write-Pointer-Controller 321 and Read-Pointer-Controller 322 in FIG. 3. They can be passed to TAF-DPS-in-TX 311 and TAF-DPS-in-RX 321 through signal WP_CNL 316 and RP_CNL 326, respectively.

Figure 8:
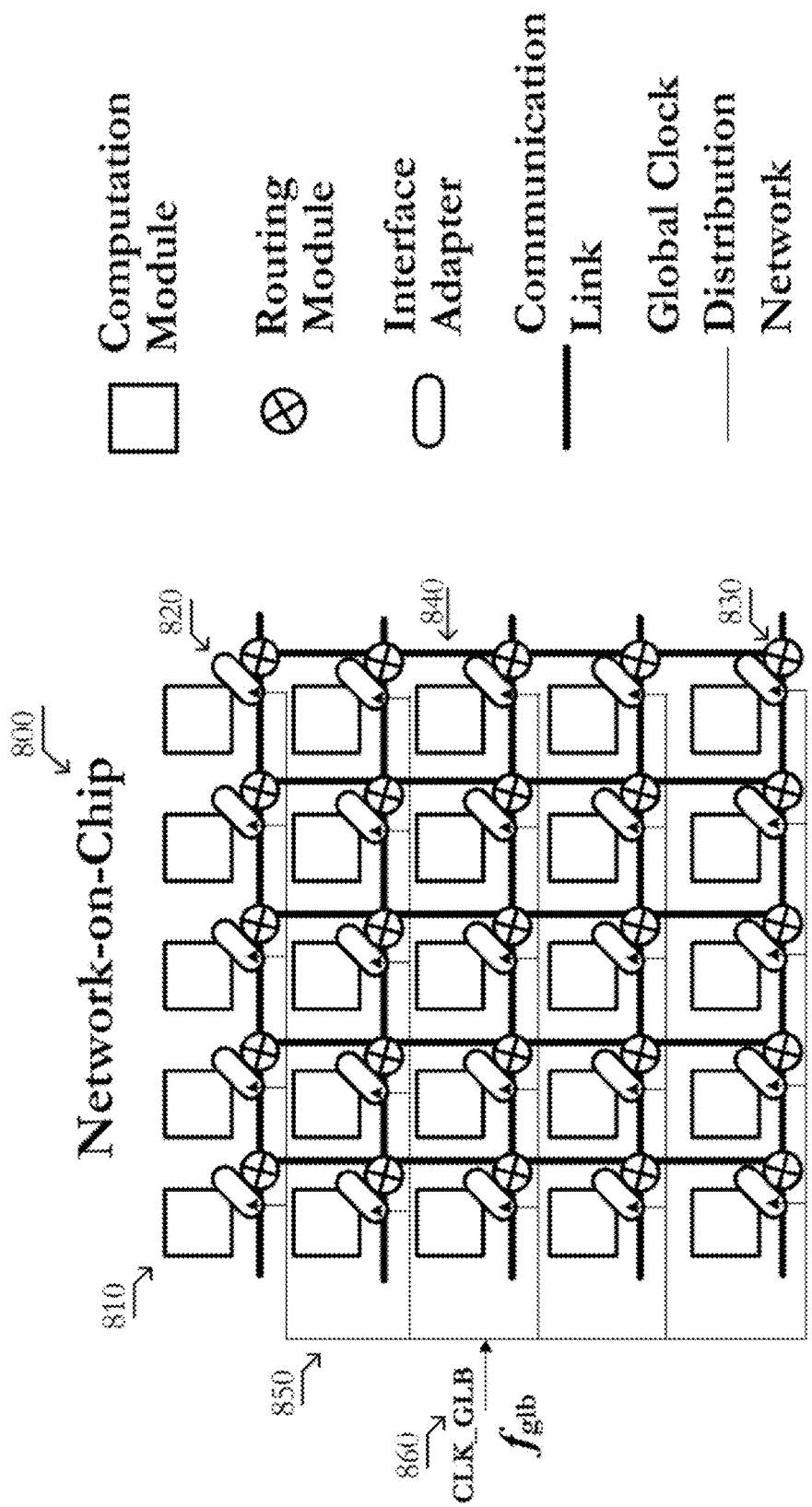
FIG. 8 is an electrical diagram, in block form, illustrating an embodiment of present invention that implements the design of using the interface adapter in a Network-on-Chip SoC.
Figure 1:
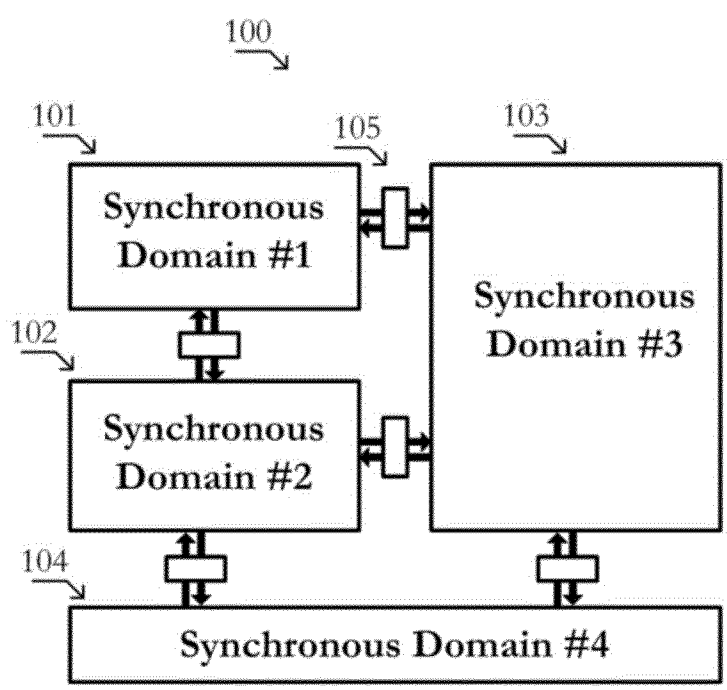
Figure 2A:
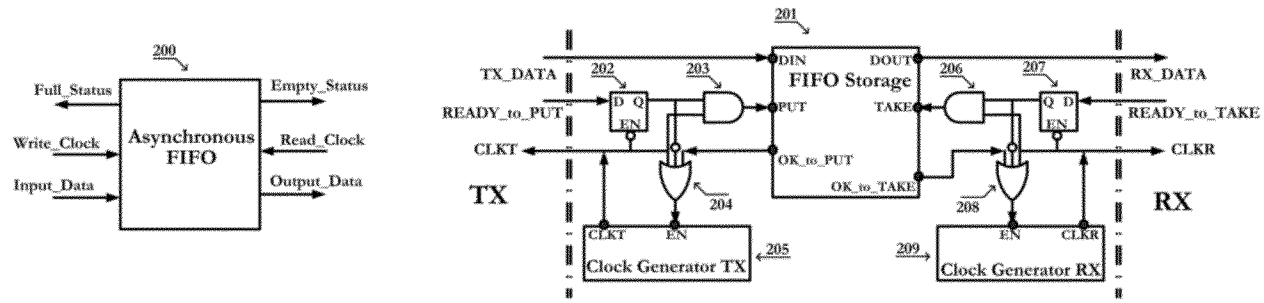
Figure 2B:
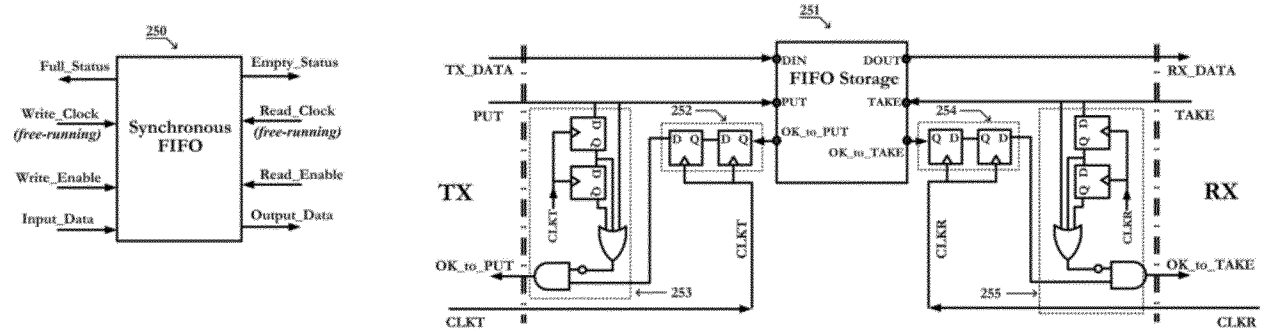
Figure 3:
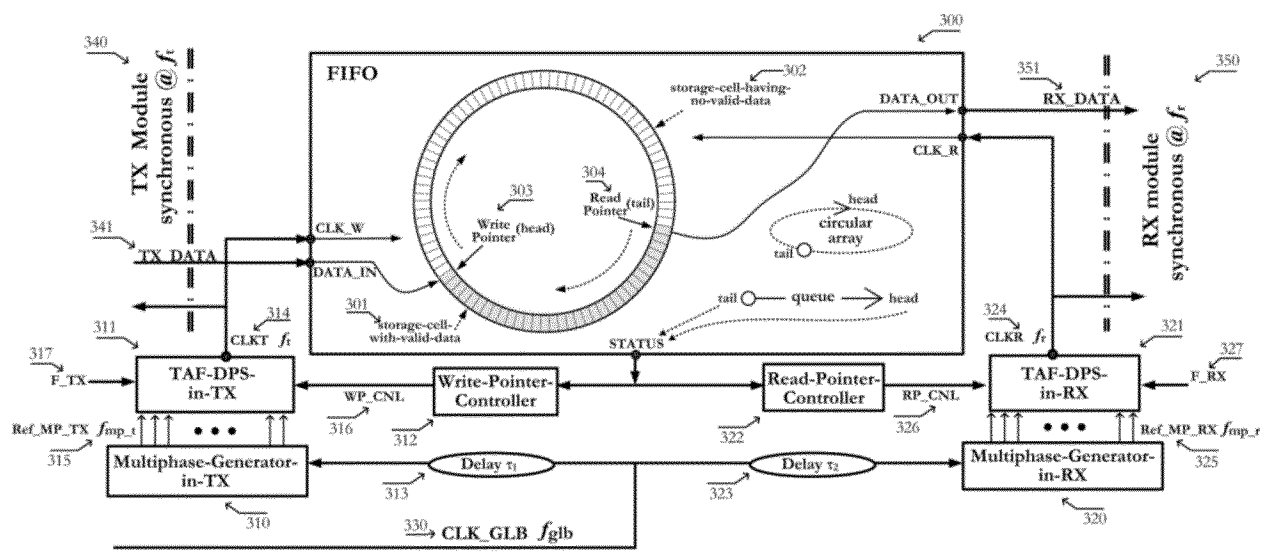
Figure 4A:
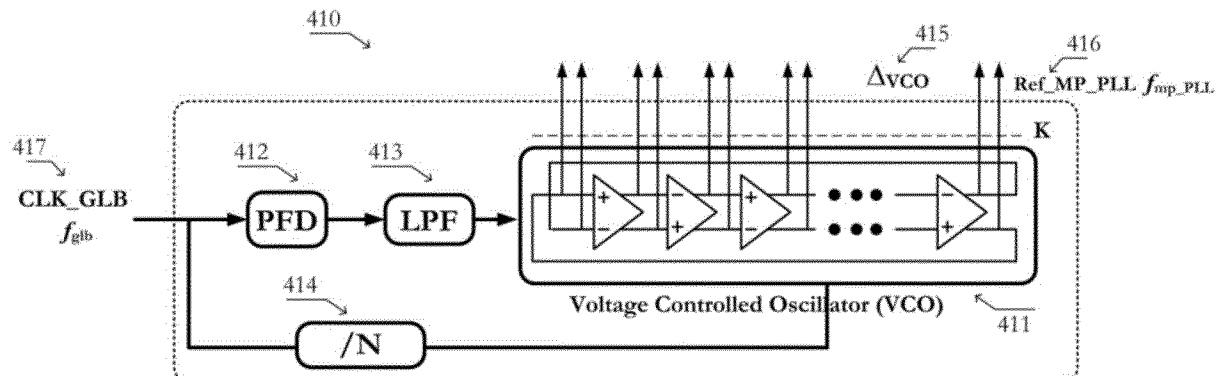
Figure 4B:
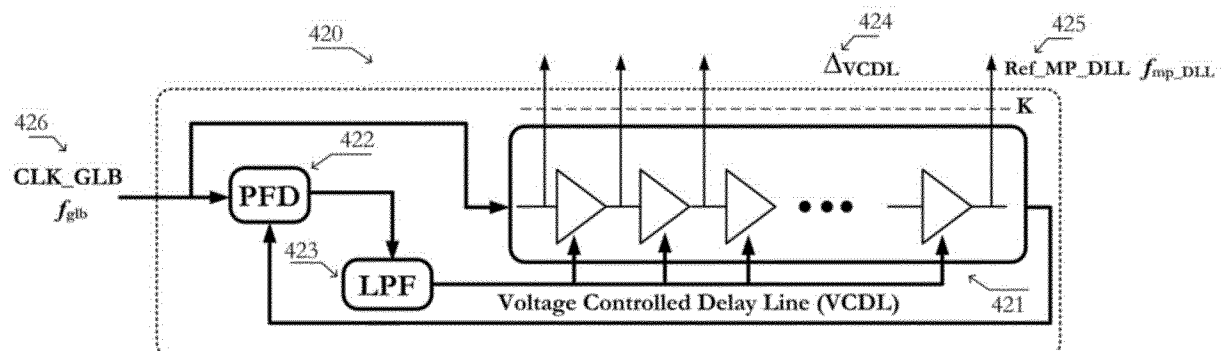
Figure 5:
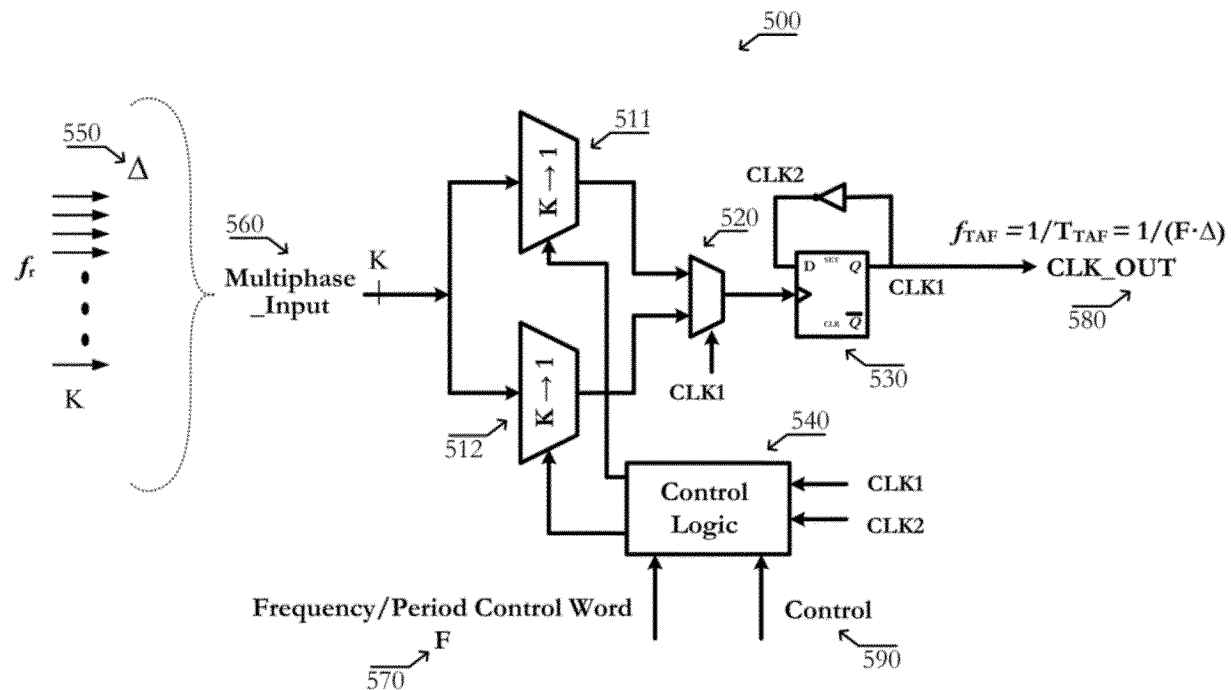
Figure 8:
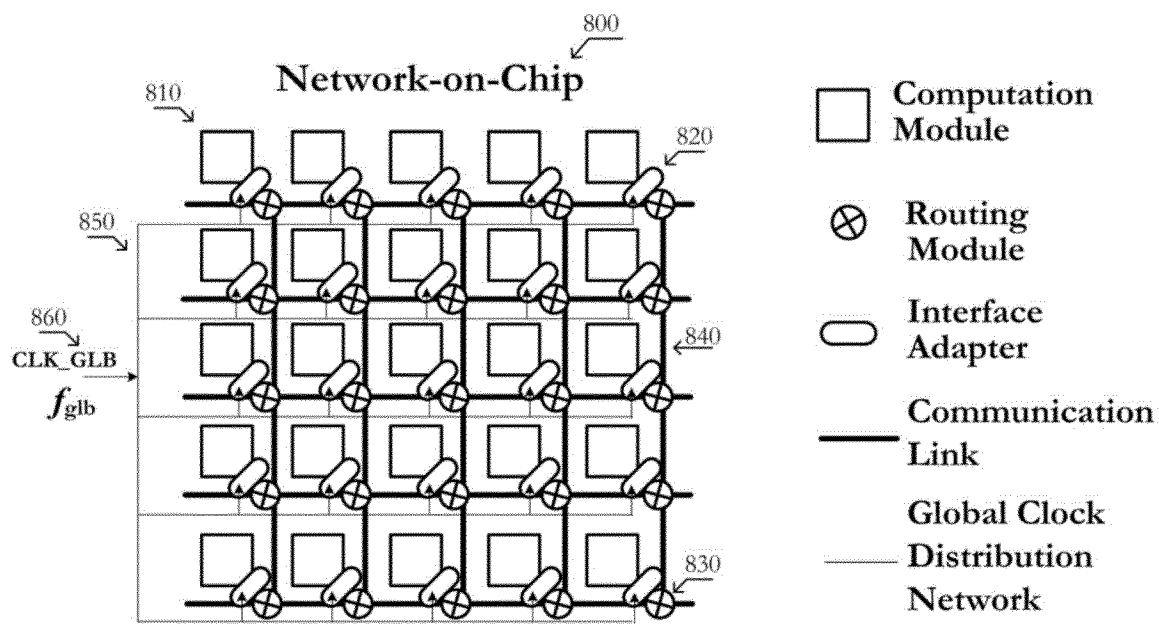

Referring now to FIG. 8, an embodiment of present invention that implements the design of using the interface adapter described in FIG. 3 in a Network-on-Chip SoC 800 comprises a plurality of computation modules 810, routing modules 830, interface adapter 820, a network of communication link 840 and a global clock distribution network 850 for distributing a global clock signal CLK_GLB 860. Each computation module 810 is a synchronous domain that is designed to perform certain computation task. The network of communication link 840 provides the communication channel for data transportation between any two computation modules of the SoC. Data presented in this network of communication link is routed to the desired computation module by routing module. Each computation module has its associated routing module. For each pair of computation module and routing module, an interface adapter of present invention is inserted in between. The global clock distribution network 850 delivers a global clock signal CLK_GLB 860 to all the interface adapters. Each interface adapter consequently generates the clock signals CLKT 314 and CLKR 324 for its associated computation module and routing module as their driving clocks as described in FIG. 3. Depending on the data flow direction, the computation module can function either as the transmitter TX or the receiver RX. Similarly, the routing module can function either as the transmitter TX or the receiver RX.

In this configuration, each computation module can have its unique operating frequency through controlling the frequency control word of its associated interface adapter. Each routing module can has its unique operating frequency that is chosen to appropriately handle the rate of data currently presented in the communication link. The rate difference is handled by the interface adapter as described previously. Therefore, the present invention advantageously reduces the system complexity without scarifying the system performance.

As indicated by equation (4)-(7) and illustrated in FIGS. 6A and 6B, the frequencies $f_t$ and $f_r$ of CLKT and CLKR can be made higher than that of signal CLK_GKB of $f_{glb}$. This enables the present invention to use a low frequency in signal CLK_GLB for global distribution. This approach makes the global clock signal CLK_GLB use less power. Further, it makes CLK_GLB more robust against the disturbances introduced from external noise sources.

Exemplary Methods of Interfacing Synchronous Domains in Heterogeneously Clocked NoC System The present invention further relates to methods of interfacing synchronous domains in a heterogeneously clocked NoC system. The method generally comprises (1) creating an interface adapter by attaching two TAF-DPS clock generators and two multi-phase generators on the two sides of a FIFO; 2) generating a clock signal from one TAF-DPS clock generator and using it as the driving clock of the transmitter and the write clock of the FIFO, generating a clock signal from the other TAF-DPS clock generator and using it as the driving clock of the receiver and the read clock of the FIFO; 3) connecting the data output from the transmitter to the data input of the FIFO, connecting the data output from the FIFO to the data input of the receiver; 4) outputting the FIFO status to both the TAF-DPS clock generators and using it to control the TAF-DPS clock outputs and subsequently control the rates of FIFO data in-flow and data out-flow; 5) using a global clock distribution network to deliver a global clock signal to all the interface adapters; 6) connecting the global clock signal to both multi-phase generators in each interface adapters; 7) generating a multi-phase signal from each multi-phase generator by using PLL or DLL, using the global clock signal as the reference signal for the PLL or DLL; 8) for the two multi-phase generators in each interface adapters, send the multi-phase signal from one multi-phase generator to the TAF-DPS on the transmitter side, send the multi-phase signal from the other multi-phase generator to the TAF-DPS on the receiver side; 9) creating a SoC by including a plurality of computation modules, routing modules, said interface adapters, a network of communication link, a network of global clock distribution; 10) placing the interface adapter in between each pair of computation module and routing module to facility the task of data communication for each computation module.

CONCLUSION/SUMMARY

Thus, the present invention provides circuits and methods to efficiently handle the data communication problem between blocks having different operating clock frequencies and phases in a heterogeneously clocked NoC system. The present invention can reduce the overall system complexity and the overall system power consumption. It can enhance the system performance by reducing the data latency occurred in data transportation. It can help achieve the goals of lower cost, higher reliability and smaller physical size The present invention uses Time-Average-Frequency direct period synthesizer to create the clock signals for the interface adapters and the computation modules. Thus, the present invention advantageously utilizes the TAF-DPS clock generator's capabilities of arbitrary frequency generation and instantaneous frequency switching to facilitate the computation and communication tasks. The present invention further improves the system communication efficiency by reducing the data latency in the data transportation through the use of stoppable clock, stretchable clock and data-pattern dependent clock.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

[1] L. Xiu, "*Nanometer Frequency Synthesis beyond Phase Locked Loop*," August 2012, John Wiley IEEE press.

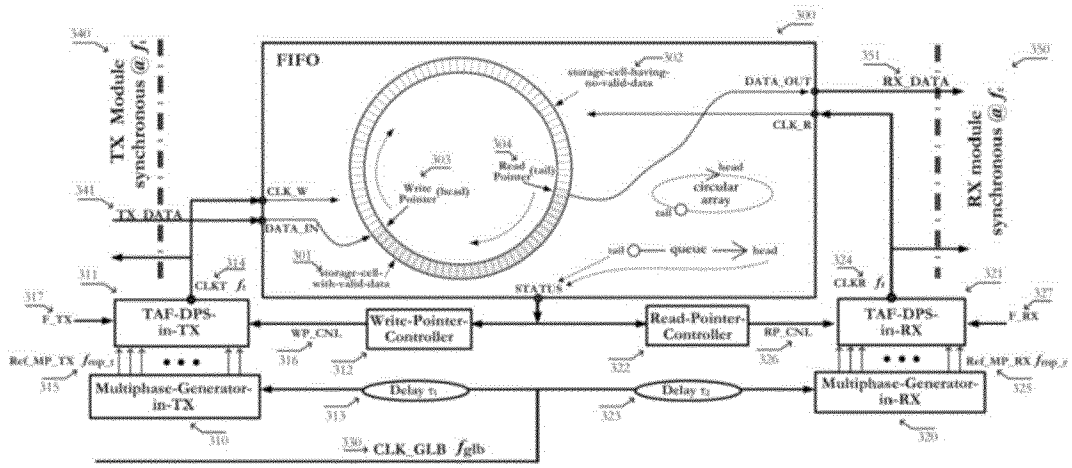

What is claimed is:

1. A system of interface adapter for facilitating data communication between two data processing units driven by clocks of different frequencies, comprising:
   a data input for receiving data signal from a transmitting data processing unit;
   a data output for sending data signal to a receiving data processing unit;
   a clock input for receiving a global clock signal;
   a FIFO block for storing data, having a predefined number of storage cells, having a data input port for receiving data, having a data output port for sending data, having a first clock input port for receiving a clock signal to control FIFO write operation, having a second clock input port for receiving a clock signal to control FIFO read operation, having a status output port for outputting a status signal regarding FIFO status;
   a first multi-phase generator for generating a first multi-phase signal, having an input port for receiving said global clock signal, having an output port for outputting said first multi-phase signal;
   a second multi-phase generator for generating a second multi-phase signal, having an input port for receiving said global clock signal, having an output port for outputting said second multi-phase signal;
   a first TAF-DPS (Time-Average-Frequency Direct Period Synthesis) clock generator for generating a clock signal for FIFO write operation and for driving said transmitting data processing unit, having a first input port for receiving said first multi-phase signal, having a second input port for receiving a first frequency control word, having a third input port for receiving a first control signal, having an output port for outputting a first generated clock signal;
   a second TAF-DPS clock generator for generating a clock signal for FIFO read operation and for driving said receiving data processing unit, having a first input port for receiving said second multi-phase signal, having a second input port for receiving a second frequency control word, having a third input port for receiving a second control signal, having an output port for outputting a second generated clock signal;
   a write-point-controller for generating said first control signal, having an input port for receiving said status signal regarding FIFO status, having an output port for outputting said first control signal;
   a read-point-controller for generating said second control signal, having an input port for receiving said status signal regarding FIFO status, having an output port for outputting said second control signal;
   wherein said data input port of FIFO is connected to said data input;
   wherein said data output port of FIFO is connected to said data output;
   wherein said first generated clock signal is connected to the first clock input port of said FIFO block;
   wherein said second generated clock signal is connected to the second clock input port of said FIFO block.

2. The system of claim 1, wherein the FIFO block comprises:
   a plurality of storage cells for storing data, each said storage cell having an address, a data input pin, a data output pin, a write clock pin and a read clock pin, said data input pin is connected to said FIFO data input port through a write enable signal, said data output pin is connected to said FIFO data output port through a read enable signal, said write clock pin is connected to said FIFO first clock input port, said read clock pin is connected to said FIFO second clock input port;
   a write pointer for storing address of a cell where next to-be-written data will be sent to, said write enable signal is controlled by said write pointer, said write pointer points to next adjacent address following a predefined direction after each write operation, write operation is controlled by a clock signal received from said write clock pin;
   a read pointer for storing address of a cell where next to-be-read data will be read from, said read enable signal is controlled by said read pointer, said read pointer points to next adjacent address following said predefined direction after each read operation, read operation is controlled by a clock signal received from said read clock pin.

3. The system of claim 1, wherein the first multi-phase generator comprises:
   an integer-N PLL, for generating said first multi-phase signal, comprising:
      a phase detector having a first input receiving said global clock signal and a second input receiving a feedback signal, for producing an error signal at an output corresponding to a phase and frequency difference between said global clock signal and feedback signals;
      a filter for low-pass filtering the error signal;
      a frequency divider of certain dividing ratio having an input receiving a clock signal, and an output coupled to the phase detector as the feedback signal;
      a voltage-controlled oscillator for generating a plurality of evenly-spaced-in-phase outputs at a frequency selected by the filtered error signal, wherein one of the plurality of the outputs is coupled to the frequency divider as the input signal, having an output for delivering said plurality of evenly-spaced-in-phase outputs as said first multi-phase signal.

4. The system of claim 1, wherein the second multi-phase generator comprises:
   an integer-N PLL, for generating said second multi-phase signal, comprising:
      a phase detector having a first input receiving said global clock signal and a second input receiving a feedback signal, for producing an error signal at an output corresponding to a phase and frequency difference between said global clock signal and feedback signals;
      a filter for low-pass filtering the error signal;
      a frequency divider of certain dividing ratio having an input receiving a clock signal, and an output coupled to the phase detector as the feedback signal;
      a voltage-controlled oscillator for generating a plurality of evenly-spaced-in-phase outputs at a frequency selected by the filtered error signal, wherein one of the plurality of the outputs is coupled to the frequency divider as the input signal, having an output for delivering said plurality of evenly-spaced-in-phase outputs as said second multi-phase signal.

5. The system of claim 1, wherein the first multi-phase generator comprises:
   a Delay Locked Loop, for generating said first multi-phase signal, comprising:
      a phase detector having a first input receiving said global clock signal and a second input receiving a feedback signal, for producing an error signal at an output corresponding to a phase and frequency difference between said global clock signal and feedback signals;
a filter for low-pass filtering the error signal;
a series of delay stages comprised of identical cells for generating a time delay at a value selected by the filtered error signal, wherein the input of the first cell is connected to said global clock signal, wherein the output of the last cell is coupled to the phase detector as the feedback signal, having an output for delivering said plurality of outputs generated from the outputs of all said cells as said first multi-phase signal.

6. The system of claim 1, wherein the second multi-phase generator comprises:
a Delay Locked Loop, for generating said second multi-phase signal, comprising:
a phase detector having a first input receiving said global clock signal and a second input receiving a feedback signal, for producing an error signal at an output corresponding to a phase and frequency difference between said global clock signal and feedback signals;
a filter for low-pass filtering the error signal;
a series of delay stages comprised of identical cells for generating a time delay at a value selected by the filtered error signal, wherein the input of the first cell is connected to said global clock signal, wherein the output of the last cell is coupled to the phase detector as the feedback signal, having an output for delivering said plurality of outputs generated from the outputs of all said cells as said second multi-phase signal.

7. The system of claim 1, wherein the first TAF-DPS clock generator having a first input port for receiving said first multi-phase signal, having a second input port for receiving said first frequency control word, having a third input port for receiving said first control signal, having an output port for outputting said first generated clock signal, comprises:
a first K→1 multiplexer, having a multi-bit reference input for receiving said first multi-phase signal, having a control input, having an output;
a second K→1 multiplexer, having a multi-bit reference input for receiving said first multi-phase signal, having a control input, having an output;
a 2→1 multiplexer, having a first input for receiving the output from said first K→1 multiplexer, having a second input for receiving the output from said second K→1 multiplexer, having a control input, having an output;
a toggle flip-flop for generating a pulse train, comprises:
a D-type flip-flop, having a clock input for receiving output from the output of said 2→1 multiplexer, having a data input, having an output for outputting a CLK1 signal;
an inverter, having an input for receiving said CLK1 signal, having an output for outputting a CLK2 signal;
wherein said CLK2 signal is connected to said data input of said D-type flip-flop;
wherein said CLK1 signal contains said pulse train;
a control logic block, having a first input for receiving said first frequency control word, having a second input for receiving said first control signal, having a third input for receiving said CLK1 signal, having a fourth input for receiving said CLK2 signal, having a first output connected to said control input of said first K→1 multiplexer, having a second output connected to said control input of said second K→1 multiplexer;
wherein said CLK1 signal is connected to the control input of said 2→1 multiplexer;
wherein said CLK1 signal is outputted as first generated clock signal.

8. The system of claim 1, wherein the second TAF-DPS clock generator having a first input port for receiving said second multi-phase signal, having a second input port for receiving said second frequency control word, having a third input port for receiving said second control signal, having an output port for outputting said second generated clock signal, comprises:
a first K→1 multiplexer, having a multi-bit reference input for receiving said second multi-phase signal, having a control input, having an output;
a second K→1 multiplexer, having a multi-bit reference input for receiving said second multi-phase signal, having a control input, having an output;
a 2→1 multiplexer, having a first input for receiving the output from said first K→1 multiplexer, having a second input for receiving the output from said second K→1 multiplexer, having a control input, having an output;
a toggle flip-flop for generating a pulse train, comprises:
a D-type flip-flop, having a clock input for receiving output from the output of said 2→1 multiplexer, having a data input, having an output for outputting a CLK1 signal;
an inverter, having an input for receiving said CLK1 signal, having an output for outputting a CLK2 signal;
wherein said CLK2 signal is connected to said data input of said D-type flip-flop;
wherein said CLK1 signal contains said pulse train;
a control logic block, having a first input for receiving said second frequency control word, having a second input for receiving said second control signal, having a third input for receiving said CLK1 signal, having a fourth input for receiving said CLK2 signal, having a first output connected to said control input of said first K→1 multiplexer, having a second output connected to said control input of said second K→1 multiplexer;
wherein said CLK1 signal is connected to the control input of said 2→1 multiplexer;
wherein said CLK1 signal is outputted as second generated clock signal.

9. A method of creating an interface adapter, comprising the steps of:
including a FIFO block for storing data;
generating a clock signal from a first TAF-DPS clock generator and using it as driving clock of a data processing block sending data and using it as write clock of the FIFO, generating a clock signal from a second TAF-DPS clock generator and using it as driving clock of a data processing block receiving data and using it as read clock of the FIFO;
connecting data output from said data processing block sending data to data input of the FIFO, connecting data output from the FIFO to data input of said data processing block receiving data;
outputting the FIFO status to said first and second TAF-DPS clock generators and using it to control the generated clock signals of said first and second TAF-DPS clock generators and subsequently control the FIFO data in-flow and data out-flow;

receiving a global clock signal from the global clock distribution network, delivering the global clock signal to a first multi-phase generator and a second multi-phase generator;

generating a first multi-phase signal from said first multi-phase generator by using PLL or DLL, using the received global clock signal as reference signal for the PLL or DLL;

generating a second multi-phase signal from said second multi-phase generator by using PLL or DLL, using the received global clock signal as reference signal for the PLL or DLL;

sending the first multi-phase signal to the first TAF-DPS, sending the second multi-phase signal to the second TAF-DPS.

10. The method of claim 9, wherein the generation of multi-phase signal by using a PLL comprising the steps of:

generating a plurality of evenly-spaced-in-phase signals from a voltage-controlled oscillator comprised of multiple delay stages;

locking said voltage-controlled oscillator to said global clock signal through a phase locked loop by comparing the frequency and phase difference of a divided down signal of one of said evenly-spaced-in-phase signals and said global clock signal.

11. The method of claim 9, wherein the generation of multi-phase signal by using a DLL comprising the steps of:

generating a plurality of evenly-spaced-in-phase signals from a voltage controlled delay line comprised of multiple delay stages;

locking said voltage controlled delay line to said global clock signal through a delay locked loop by comparing the frequency and phase difference of one of said evenly-spaced-in-phase signals and said global clock signal.

* * * * *

UNITED STATES PATENT AND TRADEMARK OFFICE
CERTIFICATE OF CORRECTION

PATENT NO. : 9,740,235 B1
APPLICATION NO. : 14/639332
DATED : August 22, 2017
INVENTOR(S) : Liming Xiu It is certified that error appears in the above-identified patent and that said Letters Patent is hereby corrected as shown below:

Delete the title page and substitute therefore with the attached title page consisting of the corrected illustrative figure(s).

Please replace FIGS. 1-5 and FIG. 8 with FIGS. 1-5 and FIG. 8 as shown on the attached pages.

Signed and Sealed this
Twenty-eighth Day of July, 2020

Andrei Iancu
*Director of the United States Patent and Trademark Office*

(12) United States Patent
Xiu

(10) Patent No.: US 9,740,235 B1
(45) Date of Patent: Aug. 22, 2017

(54) CIRCUITS AND METHODS OF TAF-DPS BASED INTERFACE ADAPTER FOR HETEROGENEOUSLY CLOCKED NETWORK-ON-CHIP SYSTEM

(71) Applicant: Liming Xiu, Plano, TX (US)

(72) Inventor: Liming Xiu, Plano, TX (US)

(73) Assignee: Liming Xiu, Plano, TX (US)

( * ) Notice: Subject to any disclaimer, the term of this patent is extended or adjusted under 35 U.S.C. 154(b) by 132 days.

(21) Appl. No.: 14/639,332

(22) Filed: Mar. 5, 2015

(51) Int. Cl.
*G06F 1/08* (2006.01)
*G06F 1/12* (2006.01)

(52) U.S. Cl.
CPC ........ *G06F 1/08* (2013.01); *G06F 1/12* (2013.01)

(58) Field of Classification Search
CPC .................................. G06F 1/08; G06F 1/12
See application file for complete search history.

(56) References Cited

U.S. PATENT DOCUMENTS

| | | | | |
|---|---|---|---|---|
| 2007/0055718 A1* | 3/2007 | Xu | ............ | G06F 1/025 708/270 |
| 2008/0215786 A1* | 9/2008 | Goossens | ............ | H04L 12/417 710/243 |
| 2009/0049212 A1* | 2/2009 | Mangano | ............ | H04L 7/005 710/61 |
| 2011/0285439 A1* | 11/2011 | Xiu | ............ | G06F 1/025 327/159 |
| 2014/0093015 A1* | 4/2014 | Xiu | ............ | H03L 7/0807 375/340 |
| 2014/0197867 A1* | 7/2014 | Xiu | ............ | G06F 1/08 327/105 |
| 2014/0376569 A1* | 12/2014 | Philip | ............ | G06F 1/04 370/503 |
| 2016/0173074 A1* | 6/2016 | Chen | ............ | H03K 5/135 365/233.11 |

\* cited by examiner

*Primary Examiner* — Jaweed A Abbaszadeh
*Assistant Examiner* — Cheri Harrington
(74) *Attorney, Agent, or Firm* — Liming Xiu

(57) ABSTRACT

An interface adapter for facilitating the data communication among computation modules in a Network-on-Chip SoC comprises 1) a FIFO block having certain number of storage cells for temporarily storing the data to be transported between two communicating modules; 2) a TAF-DPS clock generator and a multi-phase generator attached at the FIFO write side for generating the write clock for FIFO and the driving clock for the transmitter, a TAF-DPS clock generator and a multi-phase generator attached at the FIFO read side for generating the read clock for FIFO and the driving clock for the receiver; 3) a write pointer controller and a read pointer controller for reading the FIFO status and controlling the TAF-DPS clock generators at the write side and at the read side, respectively. A design scheme of using said interface adapters in Network-on-Chip SoC design includes a plurality of computation modules, routing modules, said interface adapters, a network of communication link, a network of global clock distribution. Methods of creating the interface adapter and using it in the Network-on-Chip SoC design are also disclosed.

11 Claims, 9 Drawing Sheets